Jan. 9, 1962  E. C. CORNELL, JR  3,016,451
ELECTRODE FEED ROLL MEANS
Filed June 4, 1957  2 Sheets-Sheet 1
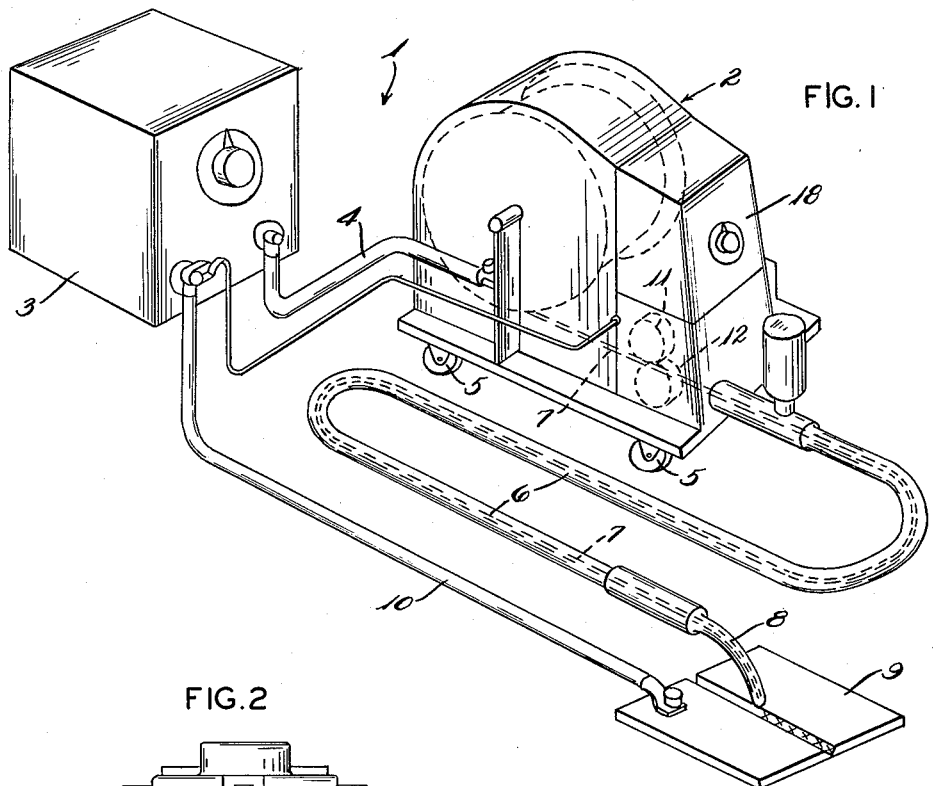
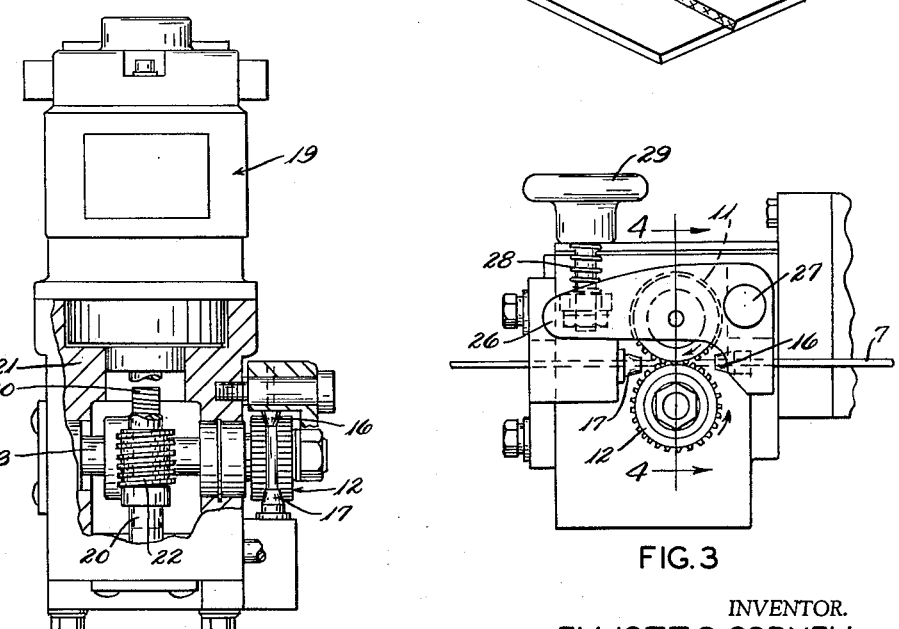
INVENTOR.
ELLIOTT C. CORNELL JR
BY Oldham & Oldham
ATTYS.

Jan. 9, 1962  E. C. CORNELL, JR  3,016,451
ELECTRODE FEED ROLL MEANS
Filed June 4, 1957  2 Sheets-Sheet 2
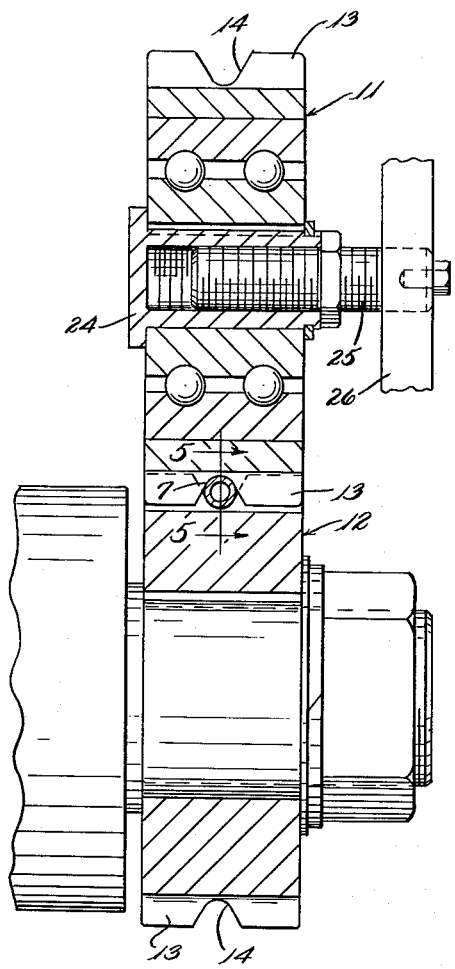
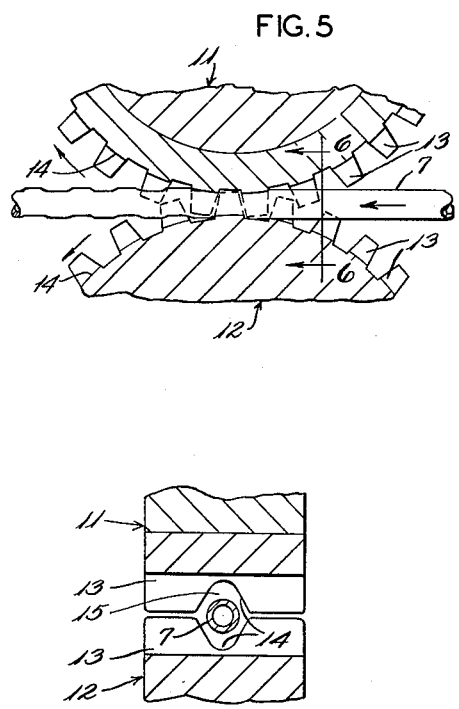
FIG. 4
FIG. 5
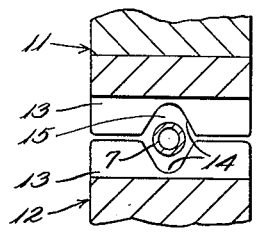
FIG. 6
INVENTOR.
ELLIOTT C. CORNELL JR.
BY *Oldham & Oldham*
ATTYS.

United States Patent Office 3,016,451
Patented Jan. 9, 1962

3,016,451
ELECTRODE FEED ROLL MEANS
Elliott C. Cornell, Jr., Cleveland, Ohio, assignor to The Auto Arc-Weld Mfg. Co., Cleveland, Ohio, a corporation of Ohio
Filed June 4, 1957, Ser. No. 663,504
1 Claim. (Cl. 219—130)

This invention relates to feed roll means, and especially to a gear-type pressure feed roll for forcing an electrode wire through a tubular welding cable for welding action.

Different styles of electrodes are made today for welding action, but many of such electrodes are of tubular construction and usually carry flux within the hollow core of the electrode wire. Electrodes of this type may be used, for example, in so-called semi-automatic welding apparatus. In such welding apparatus, usually a welding control head including a pair of feed rolls is provided at one location and welding power is supplied to such welding head. The welding head has a tubular, flexible, insulated welding cable extending therefrom and the electrode wire is forced into and through this welding cable to the end of the cable for welding action at a remote or distant point. Such welding action is controlled by a welder at the work piece.

It is difficult to feed small electrode wires through welding cables of the type described because such welding wire may have a very small diameter, such as approximately 3/32", for example. With such diameter wire, obviously the wall of the wire is thin and may be .010" thick, for example, so that the wire can be easily deformed, or torn when pressure is applied to the electrode wire to endeavor to force it into and through the tubular welding cable.

The general object of the present invention is to provide improved electrode feed rolls characterized by the use of meshing gear teeth on the feed rolls.

Another object of the invention is to provide a recess or slot in meshing gear teeth on the periphery of a pair of rotating feed rolls and with such recesses or slots being adapted to define an ever changing electrode wire receiving aperture in the meshed gear teeth on the rotating feed rolls whereby electrode wire can be fed thereto into such electrode wire receiving aperture and be engaged by the feed rolls to be forced therefrom for desired feeding action.

Another object of the invention is to provide electrode wire feed rolls providing a pressure feed engagement with a tubular electrode wire with minimum deformation or damage to the electrode wire.

Yet another object of the invention is to provide a pair of pressure feed rolls for the electrode wire and wherein uncomplicated and positive means are provided for aligning the pressure feed rolls in desired relationship with each other.

The foregoing and other objects and advantages of the invention will be made more apparent as the specification proceeds.

Reference now is directed to the accompanying drawings, wherein:

FIG. 1 is a perspective view of typical semi-automatic welding apparatus to which the invention pertains;

FIG. 2 is an enlarged elevation, partially broken away and shown in vertical section of the one electrode feed roll of the invention and showing drive means provided therefor;

FIG. 3 is a side elevation of the feed roll apparatus of the invention shown in FIG. 2;

FIG. 4 is an enlarged vertical elevation taken on line 4—4 of FIG. 3 of the feed rolls;

FIG. 5 is an enlarged fragmentary vertical section taken on line 5—5 of FIG. 4; and FIG. 6 is a fragmentary vertical section taken on line 6—6 of FIG. 5.

When referring to corresponding parts shown in the drawings and referred to in the specification, corresponding numerals are used to facilitate comparison therebetween.

The present invention, generally speaking, relates to a pressure type, positive feed for an electrode wire and to the welding apparatus associated therewith. The particular feed means comprise a pair of feed rolls having gear teeth on the peripheries thereof, means positioning the feed rolls with the gear teeth in engagement and with all of such gear teeth having a radially extending recess therein which recesses are aligned with each other and combine in adjacent meshed gear teeth to define a continually changing wire receiving aperture in the meshed gear teeth as the feed rolls are rotated. Other means are provided to drive one of the feed rolls, and means guide the electrode wire to and from the wire receiving aperture provided in the feed rolls.

The welding apparatus of the invention is indicated as a whole by the numeral 1, and it includes a welding control head, or electrode feed apparatus generally indicated by the numeral 2. A suitable source of electrical energy, such as a generator 3 and suitable control means therefor, provides electrical energy to the weld control head 2 by a cable 4. This weld control head 2 may be movably positioned such as by being supported on casters 5. The weld control head 2 has a flexible tubular welding cable 6 extending therefrom, which cable 6 is an insulated flexible welding conductor and is adapted to have an electrode wire 7 passed therethrough for welding action at the end of the cable 6. A suitable electrode holder 8 is provided at the end of this welding cable 6 so that a welder can support such electrode holder 8 in desired relationship to a work piece 9 and complete the weld action thereon by current flowing from the electrode wire 7 through the work piece 9 and back through the generator 3 by a return lead 10. The electrical welding current is transmitted to the electrode wire 7 at the weld control head 2 as such electrode wire is being forced into and through the insulated flexible cable 6. An electrode feed motor (not shown) is provided in the weld control head 2 and its speed of rotation is controlled by actual weld conditions established by use of the electrode wire 7. Thus, on a lengthening arc at the work piece 9, the motor voltage is increased to increase the motor speed and the wire feed increases in speed to shorten the weld arc and the opposite action is secured when the weld arc becomes too small so that a substantially constant arc length is maintained at the manually controlled, or semi-automatic weld action obtained by the apparatus of the invention.

FIGS. 4 and 5 best show a pair of feed rolls 11 and 12 provided in the apparatus of the invention and forming an important feature thereof. These feed rolls 11 and 12 each has a plurality of gear teeth 13 formed on the peripheries thereof and extending substantially radially therefrom. Each of these gear teeth 13 has a recess 14 provided therein and extending from the periphery or radially outward edge of the gear teeth inwardly therefrom to a point adjacent the base, or root of each gear tooth. It will be realized that these feed rolls 11 and 12 are positioned so that the gear teeth 13 thereon are in a meshing, or inter-engaging condition and with the recesses 14 on the different feed rolls combining in adjacent gear teeth 13 to define an electrode wire receiving aperture 15. This aperture 15 has the electrode wire 7 received therein and slightly compressed by engagement of the adjacent gear teeth therewith. FIG. 5 indicates how the electrode wire 7 passes through the aperture 15 with rotation of the feed rolls 11 and 12. The feed roll 12 is the directly driven feed roll in the apparatus of the invention. It will be seen that the recesses are widest at the radially outer ends thereof and are of a size to engage the electrode wire 7 snugly at the bases of these recesses. The aperture 15 is an everchanging one as the feed rolls are rotated, but it will continually receive and confine the electrode wire 7.

Passage of the electrode wire 7 to and from the wire receiving aperture 15 in the associated feed rolls is facilitated by means of guides or nozzles 16 and 17 that engage with the electrode wire 16 immediately adjacent its passage to or movement from engagement by the pair of feed rolls 11 and 12, all as indicated in FIG. 3 of the drawings.

In FIG. 2 of the drawings, the cover or frame or enclosure means 18 positioned around some of the components of the apparatus has been removed and a drive motor 19 is shown. The output of the motor 19 is suitably engaged with and drives a shaft 20 journalled in a frame 21 provided in the welding control head 2 of the invention. This shaft 20 has a worm gear 22 provided thereon that is meshed with and drives a helical gear 30 carried on a shaft 23 to which the driven feed roll 12 is secured.

The alignment of the feed rolls 11 and 12 in desired vertically superimposed, or other aligned and engaged positions is provided by means such as a tapped sleeve 24 on which the idler feed roll 11 is journalled. Such tapped sleeve 24 engages with a threaded shaft 25 positioned on a carrier arm 26. The carrier arm 26 is pivotally secured to the frame 21 by a pin 27, or similar member. Thus, on rotary movement of the sleeve 24 on the shaft 25, the sleeve 24 and the feed roll 11 are moved axially of such shaft 25 to be brought into desired association with the driven feed roll 12. The actual pressure applied to the electrode wire 7 as it is moved into and through the apparatus of the invention is controlled by means of an adjustable spring 28, FIG. 3. This spring 28 is positioned on a carrier hand knob 29 rotatably carried by a suitable lug on the frame 21 of the electrode feed control 2. The spring 28 bears at one end on this hand knob 29 whereas the other end of the spring seats against a suitable lock bracket provided on the carrier arm 26 to urge such carrier arm 26 down towards the driven feed roll 12. Hence, the desired pressure for engagement of the electrode wire by the pair of continually engaging meshed teeth on the feed rolls 11 and 12 is provided. After the feed rolls 11 and 12 are brought into suitable vertical alignment with each other, then the actual diameter size of the aperture 15 provided in the meshed gear teeth for receiving an electrode wire can be varied slightly dependent upon the pressure exerted on the spring 28 by the hand knob 29. Thus, varying sizes of electrode wire can be processed by any one apparatus by varying the relationship of the feed rolls 11 and 12 and by varying the amount of force exerted on the carrier arm 26 by the spring 28. Greater changes in wire size would require a change of one or both of the feed rolls. In all events, it is desired that the gear teeth 13 engage the electrode wire so as to force such wire 7 positively into and through the tubular welding cable 6 provided in the apparatus of the invention and with which the novel feed rolls of the invention are normally used.

It is desirable that the tube forming the electrode 7 is not torn or deflected excessively when being passed through the feed rolls 11 and 12 inasmuch as the electrode wire will abrade the inner surface of the flexible electrode feed cable 6 severely if such wire is torn or cut appreciably. Or, if metal fragments are formed on the electrode wire, such fragments will accumulate in and deteriorate the electrode cable 6. The gear teeth 13 will form flat indentations on opposite sides of the wire 7 by means of circumferentially flat surfaces at the bottoms of the recesses 14, as indicated in FIG. 5 and will provide effective feeding engagement with the electrode wire 7. The radially inner ends of the recesses 14 thus may have transversely arcuate, or flat surfaces for the wire engaging action desired.

From the foregoing, it will be seen that a novel and useful new pair of feed rolls have been provided for the purposes indicated. These feed rolls can be used in any desired manner but are designed particularly for use with electrode wire for forcing it through welding cables in semi-automatic welding actions of the type described. Thus, it is believed that the objects of the invention have been achieved.

While one complete embodiment of the invention has been disclosed herein, it will be appreciated that modification of this particular embodiment of the invention may be resorted to without departing from the scope of the invention as defined in the appended claim.

What is claimed is:

In combination, a pair of feed rolls having gear teeth thereon in engagement, means for driving one of said feed rolls, and an insulated tubular electrode cable, an electrode wire being engaged by said gear teeth and forced thereby into and through said electrode cable for welding action, said gear teeth having corresponding recesses in the peripheries thereof but only extending part of the depth of the teeth for forming electrode wire receiving recesses in the meshed gear teeth, said recesses having bases that are flat in a circumferential direction and form sharp edges with the gear teeth walls at the ends of the recesses, said electrode wire receiving recesses being of an effective size for pressure engagement with axially spaced but diametrically opposed parts of said electrode wire by said gear teeth and for a slight compression and kinking of said electrode wire thereby.

References Cited in the file of this patent

UNITED STATES PATENTS

| | | |
|---|---|---|
| 1,328,678 | Lemieux | Jan. 20, 1920 |
| 1,903,953 | Anderson | Apr. 18, 1933 |
| 2,032,260 | Chapman | Feb. 25, 1936 |
| 2,043,362 | Wilson | June 9, 1936 |
| 2,059,089 | Clesi et al. | Oct. 27, 1936 |
| 2,066,163 | Stephens et al. | Dec. 29, 1936 |
| 2,079,956 | Burgett | May 11, 1937 |
| 2,196,647 | Snyder et al. | Apr. 9, 1940 |
| 2,914,643 | Fields et al. | Nov. 24, 1959 |